United States Patent Office 2,862,423
Patented Dec. 2, 1958

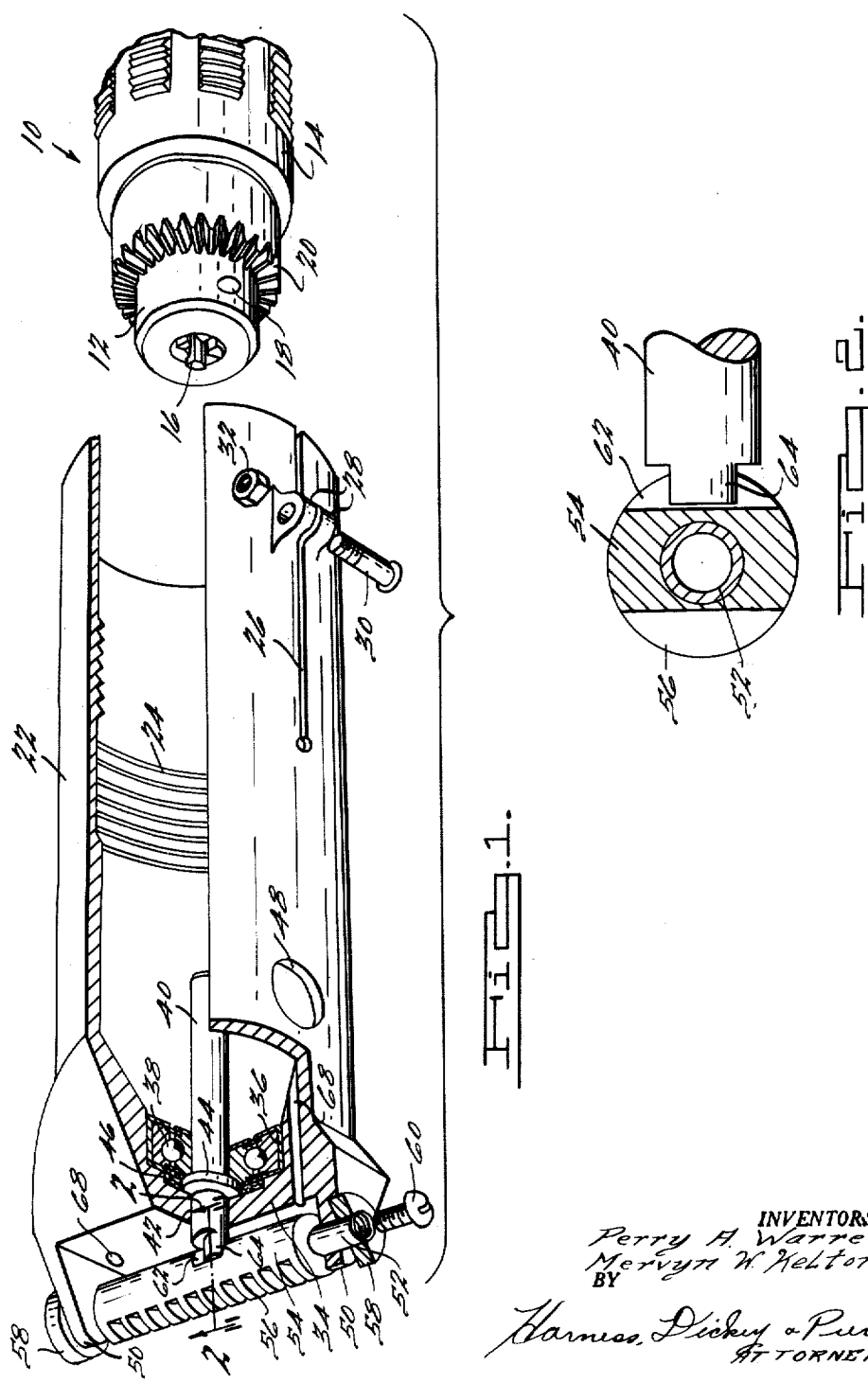

2,862,423
POWERED DEBURRING DEVICE

Perry A. Warren, Newtown, Calif., and Mervyn W. Kelton, Castro Valley, Pa., assignors, by mesne assignments, to Kaiser Industries Corporation, a corporation of Nevada Application January 3, 1955, Serial No. 479,272

2 Claims. (Cl. 90—24)

This invention relates to cutting devices and more particularly to powered devices for excising burrs or other surplus materials from a fabricated surface.

The object of this invention is to reduce the expense and improve the exactness with which burrs may be removed from metals or other surfaces.

A feature of this invention is a reciprocating cutting device positioned in spaced proximity to the edge or face of a surface to remove extraneous portions of material extending beyond that edge or face.

In the fabrication of sheet materials by sawing, routing, drilling, boring, shaping or other similar cutting operations, the cutting tool tends to bend or spin a thin web of the material along the edge of the cut, forming a burr. The removal of such burrs has proved to be an expensive, time-consuming hand filing or chipping operation.

Under the principles of the present invention, a handheld but machine powered device is provided for removing burrs, formed during fabrication operations, with a consistent preciseness and at a speed substantially greater than hand deburring. Means are provided for cutting the burrs to an accurately controlled depth without in any way damaging the parent material. The apparatus is capable not only of deleting burrs along rectilinear edges of sheet materials and surface burrs created during drilling or routing operations, but also may be manipulated to remove burrs along contoured edges or upon contoured surfaces.

The manner of accomplishment of the foregoing object and feature and other objects and features of the invention will be perceived from the following detailed description of an embodiment of the invention when read with reference to the accompanying drawings in which:

Figure 1 is a perspective view of a deburring device embodying the principles of the invention, with portions of the device being cut away to show certain internal portions of the construction, and with the driving mechanism being fragmentarily shown; and Fig. 2 is a sectional view taken substantially along the line 2—2 of Fig. 1.

While the principles of the invention may be practiced by employing a deburring device having an integral power source, the invention is exemplarily embodied in a device adapted to be associated with any of a plurality of types of power sources capable of applying to the deburring device a rotational or oscillatory motion. In Fig. 1 of the drawings, the power delivering device 10 is exemplarily represented as a pneumatically or electrically energized motor. Since suitable hand-held motors are conventional, the showing of that motor is fragmentary.

The motor 10 comprises a chuck 12 rotatably mounted within an externally threaded barrel 14. The degree of opening or closing of the jaws 16 of chuck 12 is controlled by a key (not shown) provided with a stem insertable in an aperture 18 in the chuck 12 and a gear engageable with and capable of rotating the ring gear 20.

The body or case portion 22 of the deburring device is tubular over a major portion of its length. The internal diameter of the body portion 22 is approximately the same as the external diameter of the barrel 14 of the motor 10 and is provided with internal threads 24 engageable with the external threads upon the barrel 14. The deburring attachment is assembled by inserting the barrel 14 of the motor 10 into the body portion 22 and rotating the two members relative one to another. When the motor 10 is fully seated within the body 22, those elements may be locked together by means of a clamping arrangement comprising an elongated slot 26, an apertured lug 28 on either side of the slot 26 and a bolt 30 insertable through the apertures in the lugs 28. When the nut 32 is tightened upon the bolt 30, the body or case 22 is slightly distorted to reduce the width of slot 26, thereby to clamp the barrel 14 of the motor 10 against rotation, and hence firmly to retain the parts together.

The body or case portion 22 terminates in an end portion 34 which is provided with a seat 36 for a ball bearing 38. A shaft 40, coaxial with the body portion 22, is rotatably supported by the bearing 38 and extends forwardly through an aperture 42 in the end portion 34. The end portion 34 is provided with a recess to accept an annular bearing stop 44 integrally mounted upon the shaft 40, one side of the stop 44 abutting the end portion 34 and the other side abutting the ball bearing 38 to prevent translatory movement of the shaft 40 along its longitudinal axis. A felt washer 46 may be placed circumferentially of the stop 44 to prevent the ingress of dust or moisture from the front of the adapter into the bearing 38.

When the motor 10 is screwed into the body portion 22 and clamped therein, the shaft 40 lies within the aperture bounded by the jaws 16 of the chuck 12. The chuck adjusting key, beforementioned, is insertable through an aperture 48 in the side of the body or case portion 22 to engage and rotate the ring gear 20 to cause the jaws 16 of the chuck 12 tightly to engage the shaft 40. Consequently, when the motor 10 is energized, the shaft 40 is rotated or oscillated.

A pair of apertured projections 50, lying in spaced parallelism one with the other, extend forwardly from the end portion 34. A cylindrical cutter guide 52 engages the apertures in and extends laterally of the projections 50. A blade or cutter 54 is slidably mounted upon the guide 52. While the cutter 54 is shown to be cylindrical in configuration, and more particularly right circular cylindrical, its external configuration is not important except in that its length must be sufficiently less than the distance between the inner surfaces of the projections 50 to permit motion of the cutter 54 along the guide 52 of a sufficient amplitude to permit cutting to occur. The actual cutting is performed by a plurality of teeth 56 created by forming a series of slots along one portion of the surface of the cutter 54. These slots may be cut as deeply as desired, but it is preferable that the bottoms thereof not be tangent to the longitudinal aperture which engages the guide 52. An exemplary arrangement is depicted in Fig. 2 of the drawings, showing a medial section of the cutter.

The distance between the work surface and the cutter teeth 56 is established and maintained by means of a pair of rollers 58 which may be metallic discs but are preferably constructed of fibre. Rollers 58 are centrally apertured to engage the extending ends of the cutter guide 52. As shown, the cutter guide 52 is tubular with the end portions thereof tapped to accept a screw, such as screw 60, at either end. Obviously, the cutter guide 52 may be of solid material with each end drilled and tapped. While a washer may be provided between each screw 60 and its associated roller 58, it has been found to be acceptable to merely employ the under-surface of the head of the screw as a bearing surface for the side of the roller 58. As a result, each roller 58 is prevented from moving in translation along the guide 52 by virtue of the engagement of one face thereof with the side of the projection 50 and the engagement of the other face thereof with the under-side of the head of the screw 60. The length of the guide 52, however, should be adequate so that the rollers 58 do not bind but are free to rotate.

Excellent operational results may be achieved if the diameter of the rollers 58 is greater than the diameter of the cutter 54 by .001 to .002 inch. Neither of the projections 50 should extend forwardly of the plane of the front surface of the cutter 54.

To permit driving the cutter 54, a slot 62 is cut medially of the length of the cutter 54 and preferably diametrically opposite the slots defining the teeth 56. The sides of slot 62 are engaged by a cam 64 which is shown to be circular in cross section but is eccentrically mounted upon the end of shaft 40. The forwardmost end of the shaft 40, exclusive of the eccentric cam 64, terminates short of and hence clears the rear surface of the cutter 54. The front face of the cam 64 clears the bottom face of the slot 62 so that rubbing between those faces does not normally occur. However, the forward face of the cam 64 is preferably sufficiently proximate the bottom surface of the slot 62 that rotation of the cutter 54 is prevented, obviating the necessity for the provision of keys or guides between the cutter 54 and the guide 52. A suitable clearance between the front face of the cam 64 and the bottom face of the slot 62 has been found to be about .005 inch. The width of the slot 62 is determined by the amount of travel of cutter 54 which is required, by the total possible travel of the cutter 54 as determined by the difference between its length and the distance between the inner faces of the projections 50, and by the diameter of the cam 64 and the shaft 40.

It will be seen that by virtue of the above-described arrangement, upon the application of power from motor 10 to cause the rotation or oscillation of shaft 40, the cutter 54 is driven back and forth on the cutter guide 52 longitudinally of the axis of the cutter 54, the teeth 56 are constantly presented to the surface being worked, and the distance between the main or parent surface and the cutter teeth 56 is established by the rollers 58.

Insurance of air pressure equalization may be provided by drilling a pair of apertures 68 through the end portion 34 to establish communication from the front to the inner portion of the adapter.

It will be apparent that any suitable power supply may be employed, that the configuration of the cutter 54 and of the teeth 56 may be modified to meet the requirements of any given work operation, that the diameter of the rollers 58 may be varied to control the depth of cut, that the configuration of slot 62 may be varied, such as by making it a tapered circular hole so that both rotational and longitudinal motion will be imparted to the cutter 54 to distribute the wear on the teeth 56, and the parts may be otherwise modified to facilitate the performance of any particular deburring operation.

While it will be apparent that the embodiment of the invention herein disclosed is well calculated to fullfill the objects above stated, it will be appreciated that the invention is susceptible to modification, variation and change without departing from the proper scope or fair meaning of the subjoined claims.

What is claimed is:

1. In a cutting device for association with a motor having a threaded barrel, the combination of a tubular body portion internally threaded to accept the threaded motor barrel, clamping means for effectively reducing the inner circumference of said body portion over a portion of its length, a centrally apertured end portion enclosing one end of said tubular body portion, a shaft extending through the aperture in said end portion and assocable with the motor, a cam on said shaft, a pair of apertured projections extending in substantially spaced parallelism with one another and integral with said end portion, a guide member engaging the apertures in said projections, a cutter slidably mounted on said guide member and having a pair of cam surfaces engaging said cam, means including said shaft, said cam and said cam surfaces for sliding said cutter on and relative to said guide member, and a pair of annular rollers rotatably mounted on said guide member adjacent said projections and extending beyond the face of said cutter.

2. In a cutting device for association with a motor having a threaded barrel, the combination of a tubular body portion internally threaded to accept the threaded motor barrel, clamping means for effectively reducing the inner circumference of said body portion over a portion of its length, a centrally apertured end portion enclosing one end of said tubular body portion, a shaft extending through the aperture in said end portion and associable with the motor, a bearing seated in said end portion and rotatably supporting said shaft, a bearing stop on said shaft having one face engageable with said bearing and another face engageable with said end portion, a cam on said shaft, a pair of apertured projections extending in substantially spaced parallelism with one another and integral with said end portion, a guide member engaging the apertures in said projections, a cutter slidably mounted on said guide member between said projections and having a pair of cam surfaces engaging said cam, means including said shaft, said cam and said cam surfaces for sliding said cutter on and relative to said guide member, and a pair of annular rollers rotatably mounted on said guide member adjacent said projections and extending beyond the face of said cutter.

References Cited in the file of this patent

UNITED STATES PATENTS

| 906,069 | Seferian | Dec. 8, 1908 |
|---|---|---|
| 966,108 | Mahood | Aug. 2, 1910 |
| 1,759,981 | Elzinga et al. | May 27, 1930 |
| 1,957,790 | Mavis et al. | May 8, 1934 |
| 2,124,985 | Nyhagen | July 26, 1938 |
| 2,794,247 | Negromanti | June 4, 1957 |